United States Patent
Chou

(10) Patent No.: US 12,395,351 B2
(45) Date of Patent: Aug. 19, 2025

(54) DIGITAL SIGNATURE METHOD AND VERIFICATION METHOD FOR DIGITAL SIGNATURE

(71) Applicant: REALTEK SEMICONDUCTOR CORP., Hsinchu (TW)

(72) Inventor: Li-Po Chou, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 218 days.

(21) Appl. No.: 17/952,516

(22) Filed: Sep. 26, 2022

(65) Prior Publication Data

US 2023/0353385 A1    Nov. 2, 2023

(30) Foreign Application Priority Data

Apr. 28, 2022  (TW) .................................. 111116115

(51) Int. Cl.
*H04L 9/32*  (2006.01)
*H04L 9/08*  (2006.01)

(52) U.S. Cl.
CPC .......... *H04L 9/3247* (2013.01); *H04L 9/0825* (2013.01); *H04L 9/3239* (2013.01)

(58) Field of Classification Search
CPC ... H04L 9/3247; H04L 9/0825; H04L 9/3239; H04L 9/0643
See application file for complete search history.

(56) References Cited

U.S. PATENT DOCUMENTS

| | | |
|---|---|---|
| 8,386,800 B2 | 2/2013 | Kocher et al. |
| 2005/0050332 A1* | 3/2005 | Serret-Avila ....... H04N 1/32208 713/176 |
| 2012/0216035 A1* | 8/2012 | Leggette ............... G06F 3/0643 713/157 |
| 2012/0308003 A1* | 12/2012 | Mukherjee ........... H04L 9/3247 380/243 |
| 2019/0205560 A1* | 7/2019 | Pearson .................. G06F 21/79 |
| 2023/0283479 A1* | 9/2023 | Shan ...................... H04L 67/06 713/155 |

FOREIGN PATENT DOCUMENTS

| | | |
|---|---|---|
| TW | I440351 B | 6/2014 |
| TW | 202209134 A | 3/2022 |

* cited by examiner

*Primary Examiner* — William R Korzuch
*Assistant Examiner* — Matthias Habtegeorgis
(74) *Attorney, Agent, or Firm* — Li & Cai Intellectual Property (USA) Office

(57) ABSTRACT

A digital signature method and a verification method for a digital signature are provided. The digital signature method includes configuring a processor of an electronic device to: obtain, from a memory, to-be-signed data and a private key used by the electronic device for digital signing; extract a to-be-signed data segment from the to-be-signed data; perform a hash operation on the to-be-signed data segment to obtain a first digest value; encrypt the first digest value with the private key to generate signature data; and append the signature data to the to-be-signed data to generate to-be-verified data.

10 Claims, 7 Drawing Sheets

FIG. 3

DIGITAL SIGNATURE METHOD AND VERIFICATION METHOD FOR DIGITAL SIGNATURE

CROSS-REFERENCE TO RELATED PATENT APPLICATION

This application claims the benefit of priority to Taiwan Patent Application No. 111116115, filed on Apr. 28, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a digital signature method and a verification method for a digital signature, and more particularly, to a digital signature method and a verification method for a digital signature that can improve speeds of applying and verifying a digital signature.

BACKGROUND OF THE DISCLOSURE

In the existing technology for digital signatures, input data is usually calculated directly through a hash function to generate a digest value. However, embedded systems with lower hardware specifications require extremely long computation time for large input data.

Taking 600 MB of input data as an example, when the processor of the embedded system performs a hash operation (for example, secure hash algorithm (SHA) 256-bit) to generate a digest value, at least 5 seconds is required for the 629,145,600 bytes that need to be processed, which results in an excessively long wait time for generating or verifying the digital signature.

SUMMARY OF THE DISCLOSURE

In response to the above-referenced technical inadequacies, the present disclosure provides a digital signature method and a verification method for a digital signature that can improve speeds of digital signature and verification.

In one aspect, the present disclosure provides a digital signature method applicable to an electronic device including a processor and a memory, and the digital signature method includes: configuring the processor to: obtain to-be-signed data and a private key used by the electronic device for digital signing; extract a to-be-signed data segment from the to-be-signed data; perform a hash operation on the to-be-signed data segment to obtain a first digest value; encrypt the first digest value with the private key to generate signature data; and append the signature data to the to-be-signed data to generate to-be-verified data.

In another aspect, the present disclosure provides a verification method for a digital signature, applicable to an electronic device including a processor and a memory, and the verification method for the digital signature includes: configuring the processor to: obtain a to-be-verified data and a public key used by the electronic device for verifying the digital signature; divide the to-be-verified data into signed data and signature data, wherein the public key corresponds to a private key associated with the signature data; extract a signed data segment from the signed data; perform a hash operation on the signed data segment to obtain a second digest value; decrypt the signature data with the public key to generate a third digest value; and determine whether the second digest value is consistent with the third digest value to verify the to-be-verified data.

Therefore, in the digital signature method and the verification method for the digital signature provided by the present disclosure, important data segments are extracted and reorganized from input data in a specific way, which can reduce computational complexity of the hash operation so as to improve speeds of applying and verifying the digital signature whilst preventing the input data from being tampered with.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 3 is a schematic diagram of dividing to-be-signed data according to the first embodiment of the present disclosure;

DETAILED DESCRIPTION OF THE EXEMPLARY EMBODIMENTS

Figure 1:
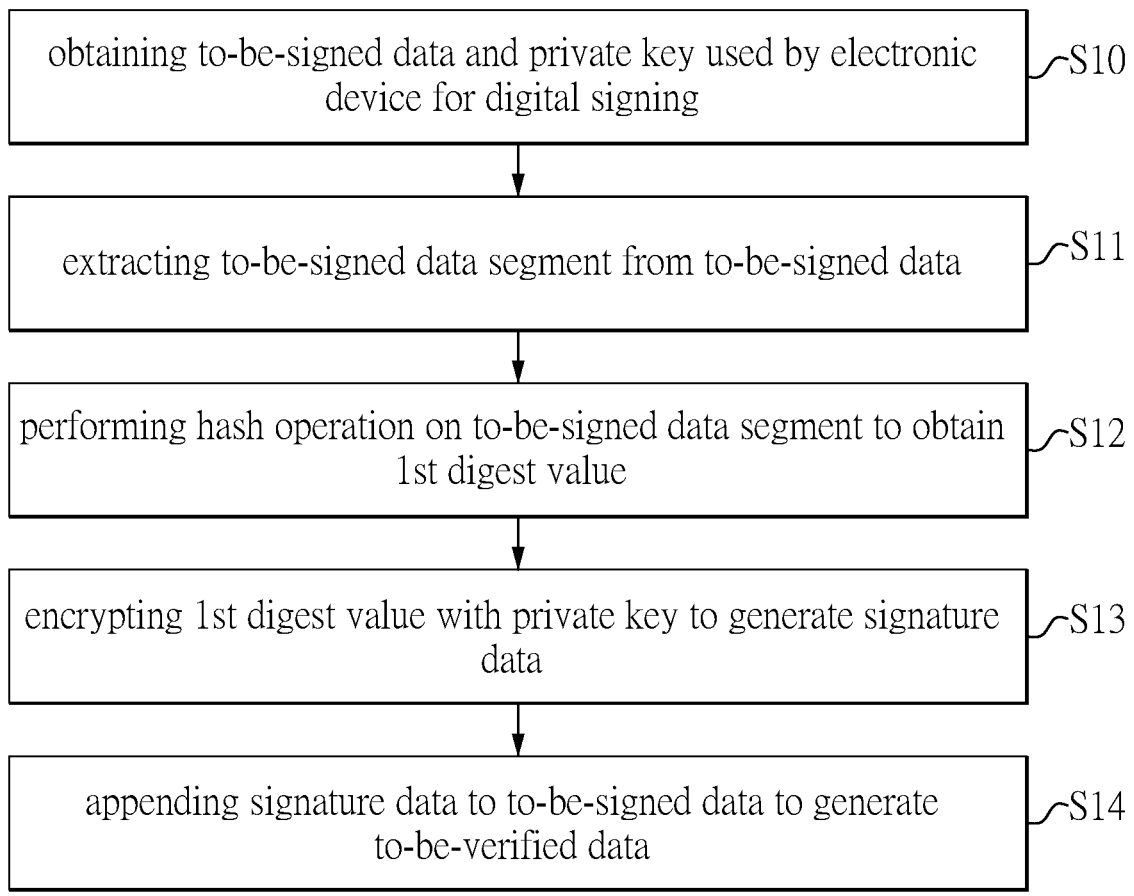
FIG. 1 is a flowchart of a digital signature method according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way.

Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

FIG. 1 is a flowchart of a digital signature method according to a first embodiment of the present disclosure. Reference is made to FIG. 1, a first embodiment of the present disclosure provides a digital signature method, which is applied to an electronic device. The electronic device includes a processor and a memory, and the digital signature method includes configuring the processor to perform the following steps:

Step S10: obtaining to-be-signed data and a private key used by the electronic device for digital signing.

In detail, the digital signature described in the present embodiment of the present disclosure is encrypted with a private key (equivalent to generating a signature), and decrypted with a public key (equivalent to verifying the signature). The private key and the public key are paired with each other. This private key is not made public and is known only to an owner of the private key. The public key paired with the private key is mathematically associated with the private key and can be distributed publicly. The digital signature is generated by the private key, and any user with the public key can then verify the signature. In some embodiments of the present disclosure, the public and private keys can be generated, for example, by RSA encryption algorithm.

Step S11: extracting a to-be-signed data segment from the to-be-signed data. In detail, this step is to extract a part of important data through a specific method, and then reorganize the extracted part of the important data into new input data.

Figure 2:
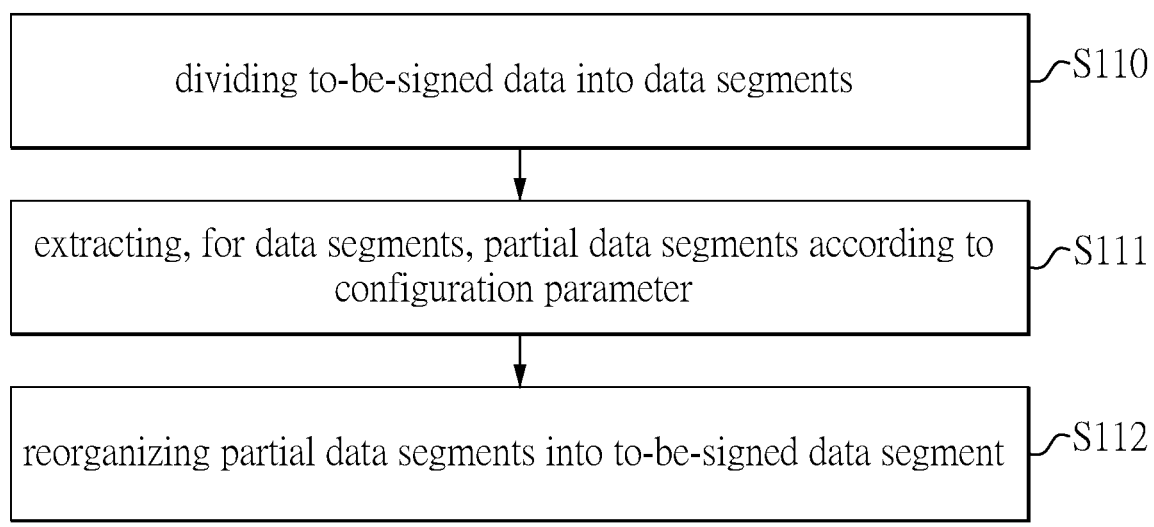
FIG. 2 is a detailed flowchart of step S11 according to the first embodiment of the present disclosure.

Reference is made to FIG. 2, which is a detailed flowchart of step S11 according to the first embodiment of the present disclosure. As shown in FIG. 2, step S11 can include the following steps:

Step S110: dividing the to-be-signed data into a plurality of data segments.

For example, the to-be-signed data can be divided into the plurality of data segments according to a configuration parameter, and the configuration parameter defines a file size for the plurality of data segments. In the present embodiment of the present disclosure, the meaning of the configuration parameter means taking one byte from every n bytes to serve as new input data, so as to reduce an amount of the new input data. In this way, a file size of the new input data can be 1/n times an original size of the to-be-signed data.

In some embodiments, the configuration parameter is a fixed value that is n bytes, where n is a positive integer ranging from 2 to 8.

Figure 3:
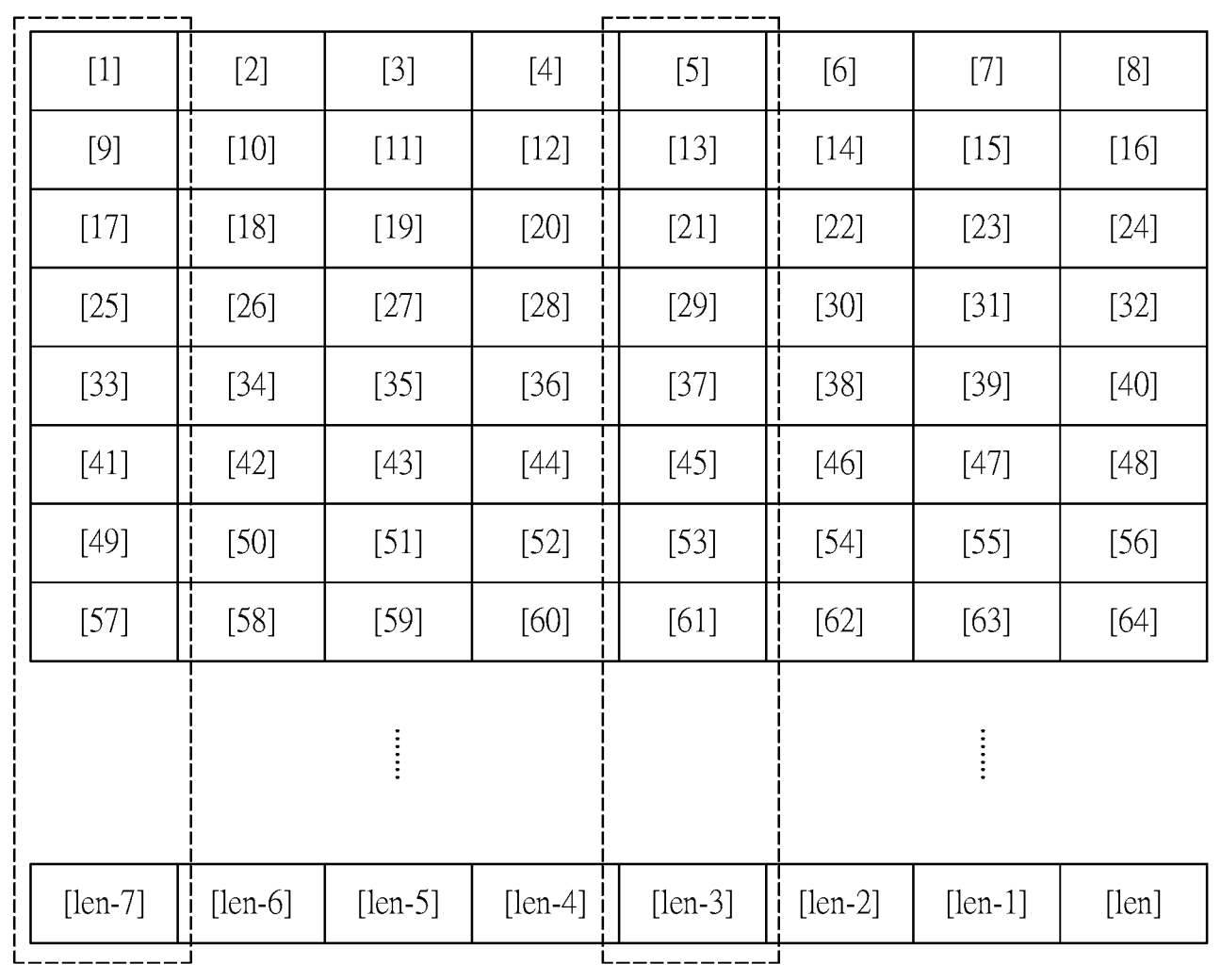

Reference is made to FIG. 3, which is a schematic diagram of dividing to-be-signed data according to the first embodiment of the present disclosure. As shown in FIG. 3, column codes len, len-1, . . . , len-7 correspond to bytes from first to eighth rows the to-be-signed data, respectively. If the input file is large, for example, more than 600 MB, in order to improve a calculation speed of the subsequent hash operation, one byte can be taken for every n bytes of the to-be-signed data according to the configuration parameters. As shown in FIG. 3, n=4 (that is, bytes corresponding to column codes len-7 and len-3 are taken) is used to divide the to-be-signed data into the plurality of data segments.

Step S111: extracting, for the plurality of data segments, the plurality of partial data segments according to the configuration parameter.

Reference is further made to FIG. 3, in which one of the bytes (for example, a first byte in four bytes) can be further extracted as one partial data segment after the to-be-signed data is divided into the plurality of data segments with n=4, and multiple ones of the extracted partial data segments can be reorganized, such that the file size of the new input data can be 1/n of the to-be-signed data. If n=4, the file size can be ¼ times the file size of the to-be-signed data.

Step S112: reorganizing the plurality of partial data segments into the to-be-signed data segment.

Step S12: performing a hash operation on the to-be-signed data segment to obtain a first digest value.

Specifically, the step of performing hash operation includes using a hash function to perform operation on the to-be-signed data segment. An input data for a hash function is often called a message, and an output of the hash function is often referred to as a message digest or digest. In this case, secure hash algorithm (SHA) can be utilized in the hash operation, for example, and SHA-2 released in 2001, including SHA-224, SHA-256, SHA-384, SHA-512, SHA-512/224, SHA-512/256, can be specifically utilized.

Therefore, when the first digest value is computed through the hash function (such as SHA-256), more than 5 seconds is originally needed for an embedded system with a lower hardware level to process the computation, and after adopting the digital signature method provided by the present disclosure, only 5/n seconds (when n=4, it takes 1.25 seconds) is needed, i.e., processing speed can be increased by 4 times.

It should be noted that, in the present embodiment, one byte is taken for every four bytes, but the present disclosure is not limited thereto. In other embodiments, the configuration parameter is a variable value that is n bytes, and n is a positive integer varying within a range from 2 to 8.

On the other hand, not too large a value should be taken as the configuration parameter. The reason is that when n is within the range of 2 to 8, data security can be improved. In detail, the way of tampering with the data can be, for example, inserting a new executable file into the original data, which usually exceeds 2 to 8 bytes. However, since the file size is limited to a specific range for extracting the data segment in the present disclosure, the original data can be effectively protected from being tampered with.

Step S13: encrypting the first digest value with the private key to generate signature data. As mentioned above, a digital signature can be generated from the private key, which can then be verified by any user with the public key.

Step S14: appending the signature data to the to-be-signed data to generate to-be-verified data.

Therefore, in the digital signature method and the verification method for the digital signature provided by the present disclosure, important data segments are extracted and reorganized from input data in a specific way, to reduce computational complexity of the hash operation, so as to improve a speed of digital signature while preventing the input data from being tampered with.

Figure 4:
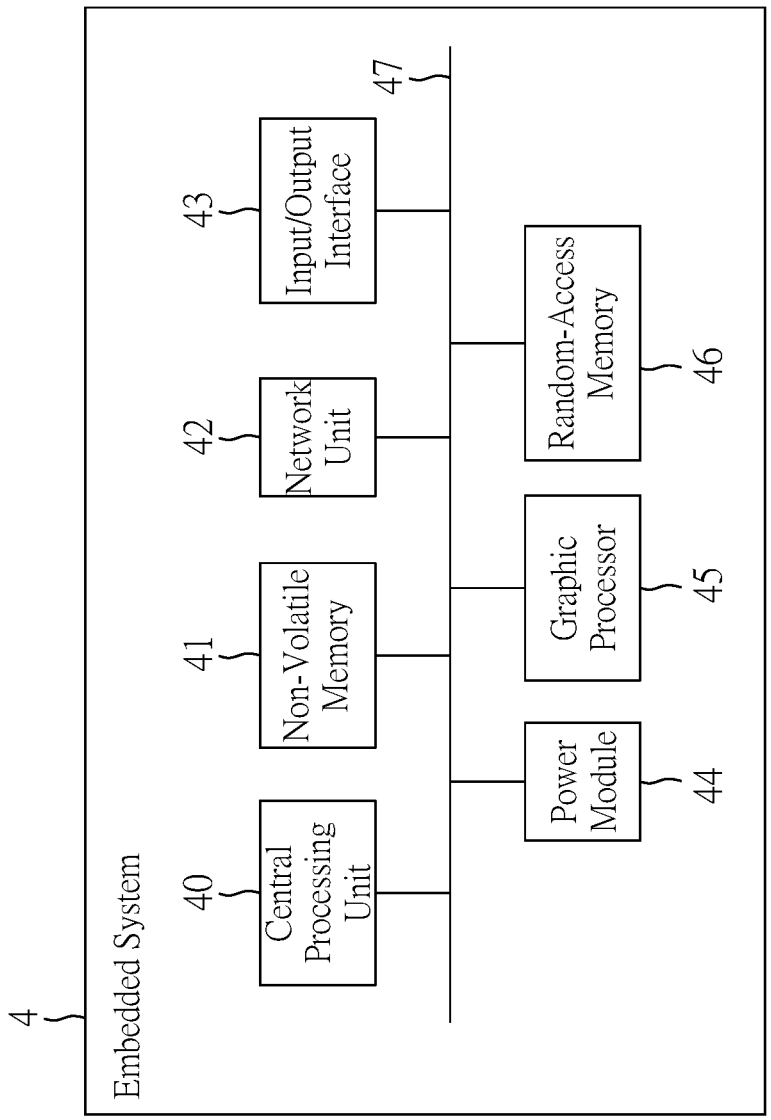
FIG. 4 is a functional block diagram of an embedded system according to the first embodiment of the present disclosure.

Reference is further made to FIG. 4, which is a functional block diagram of an embedded system according to the first embodiment of the present disclosure. As shown in FIG. 4, the electronic device of the present embodiment can be, for example, an embedded system 4 of FIG. 4, which includes a central processing unit 40, a non-volatile memory 41, a network unit 42, an input/output interface 43, a power module 44, a graphic processor 45 and a random-access memory 46, and the above elements can be electrically connected through a bus 47.

For example, the embedded system 4 can be, for example, a digital set-top box, a TV, or a network attached storage (NAS) device, and can generally include several important hardware components shown in FIG. 4. The random-access memory 46 can be, for example, a dynamic random-access memory (DRAM) or a static random-access memory (SRAM). The central processor 40 can load a program into the DRAM for program executions and data calculations. The non-volatile memory 41 can be, for example, a flash memory or an embedded memory (EMMC), which can be used to store programs or important data. The graphic processor 45 can process image data and output video signals of various specifications such as HDMI, CVBS, YPbPr, and the input/output interface 43 can include interfaces of HDMI, CVBS, YPbPr and other specifications. The power module 44 is used to manage power signals supplied to the embedded system 4.

Figure 5:
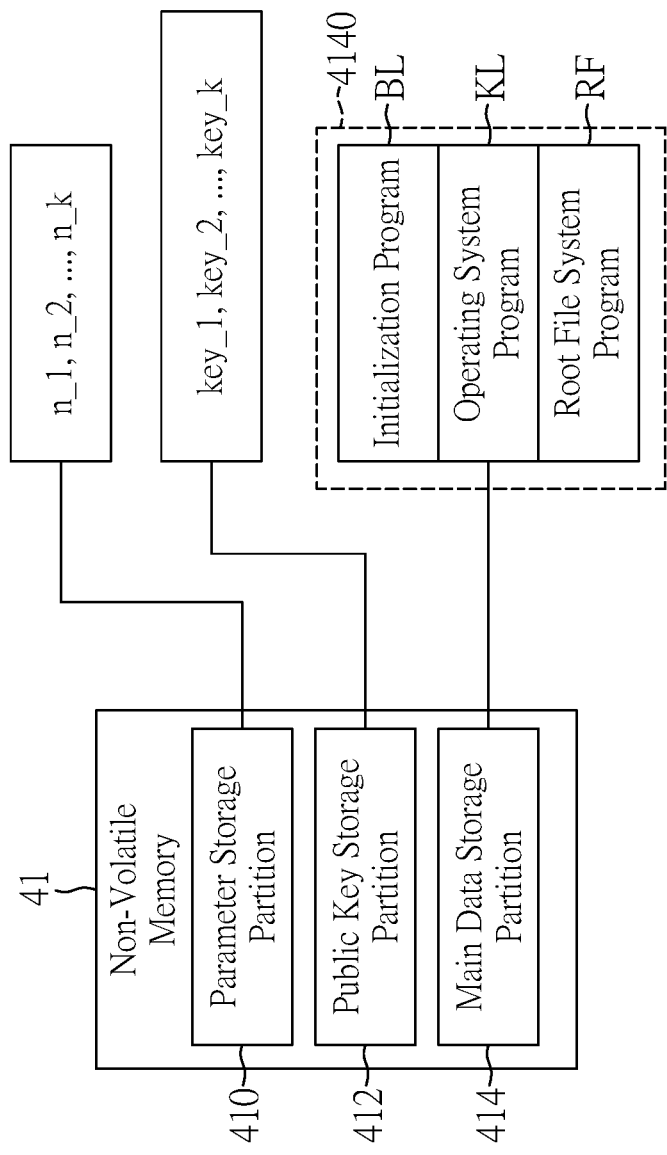
FIG. 5 is a schematic block diagram of a non-volatile memory of FIG. 4.

Reference is further made to FIG. 5, which is a schematic block diagram of a non-volatile memory of FIG. 4.

As shown in FIG. 5, the non-volatile memory 41 includes a parameter storage partition 410, a public key storage partition 412 and a main data storage partition 414. The parameter storage partition 410 stores a plurality of configuration parameters n_1, n_2, . . . , n_k, the public key storage partition 412 stores a plurality of public keys key_1, key_2, . . . , key_k, and the main data storage partition 414 stores the to-be-signed data 4140. For example, the to-be-signed data 4140 can include an initialization program BL, an operating system program KL, and a root file system program RF, which can be files such as bootloader, kernel, and rootfs commonly used in embedded systems, respectively.

For the above files, the parameter storage partition 410 can store k configuration parameters (i.e., k values of n). In practical applications, when generating files such as bootloader, kernel and rootfs, it is necessary to generate corresponding signature data together, and append the signature data to the original data (bootloader, kernel and rootfs files). A distribution of each file in the non-volatile memory is shown in FIG. 5.

For example, after a rootfs file is generated, partial data segments are extracted according to the corresponding configuration parameters and reorganized, the hash operation is used to generate the digest value, the digest value encrypt is then encrypted with the private key to generate the signature data. The signature data is then appended to the rootfs file to generate a to-be-verified file with the digital signature. A verification method for the to-be-verified file is described in a second embodiment below.

Second Embodiment

Figure 6:
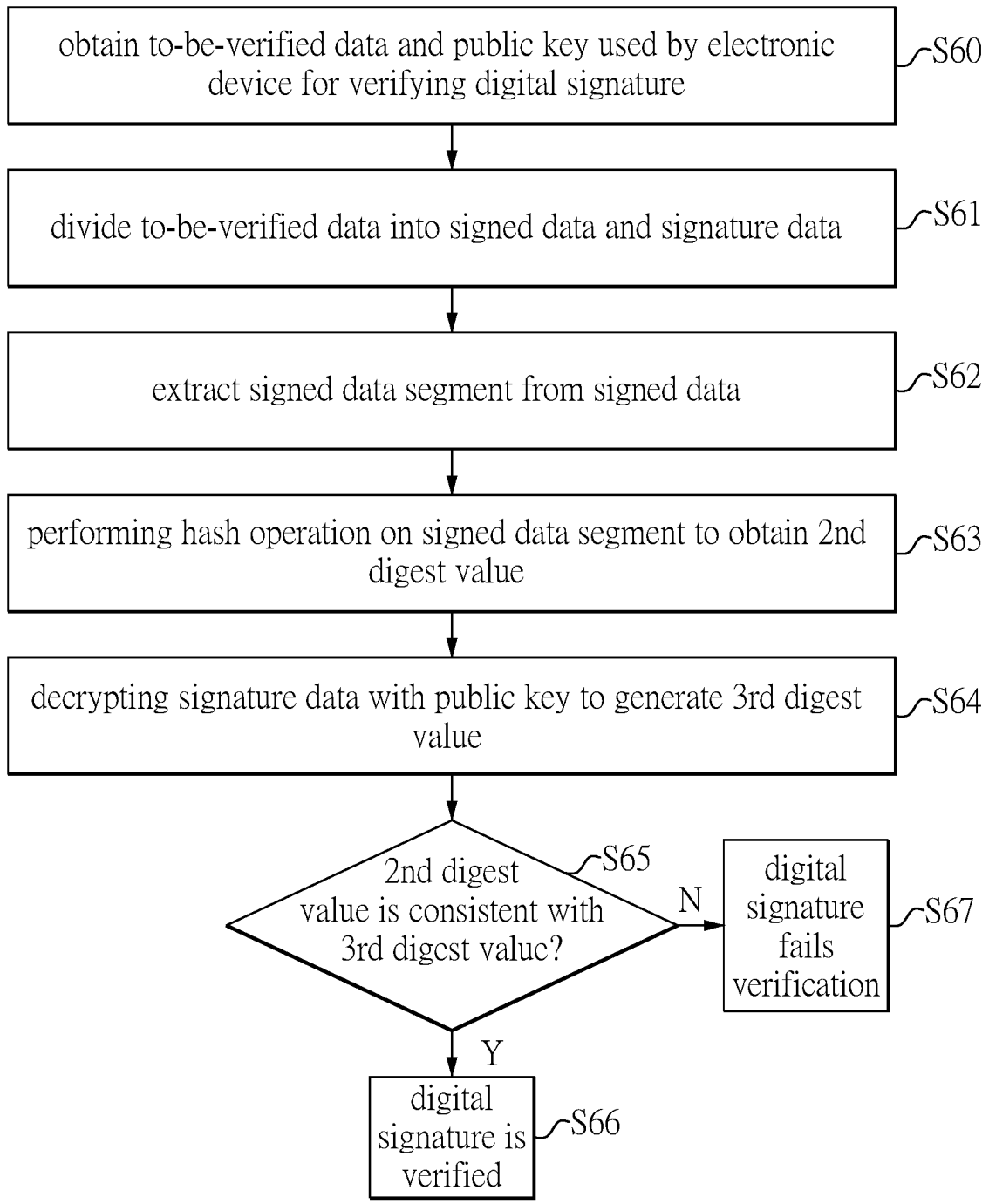
FIG. 6 is a flowchart of a verification method for a digital signature according to a second embodiment of the present disclosure.

FIG. 6 is a flowchart of a verification method for a digital signature according to a second embodiment of the present disclosure. With reference made to FIG. 6, a second embodiment of the present disclosure provides a verification method for a digital signature, the verification method can be applied to an electronic device that includes a processor and a memory, and the electronic device can be, for example, the embedded system shown in FIG. 4. The verification method for the digital signature includes configuring the processor to perform the following steps:

Step S60: obtain a to-be-verified data and a public key used by the electronic device for verifying the digital signature.

Step S61: divide the to-be-verified data into signed data and signature data. Specifically, the public key corresponds to a private key associated with the signature data. As mentioned above, the digital signature generated from the private key can be verified by any user with the public key.

Step S62: extract a signed data segment from the signed data.

Figure 7:
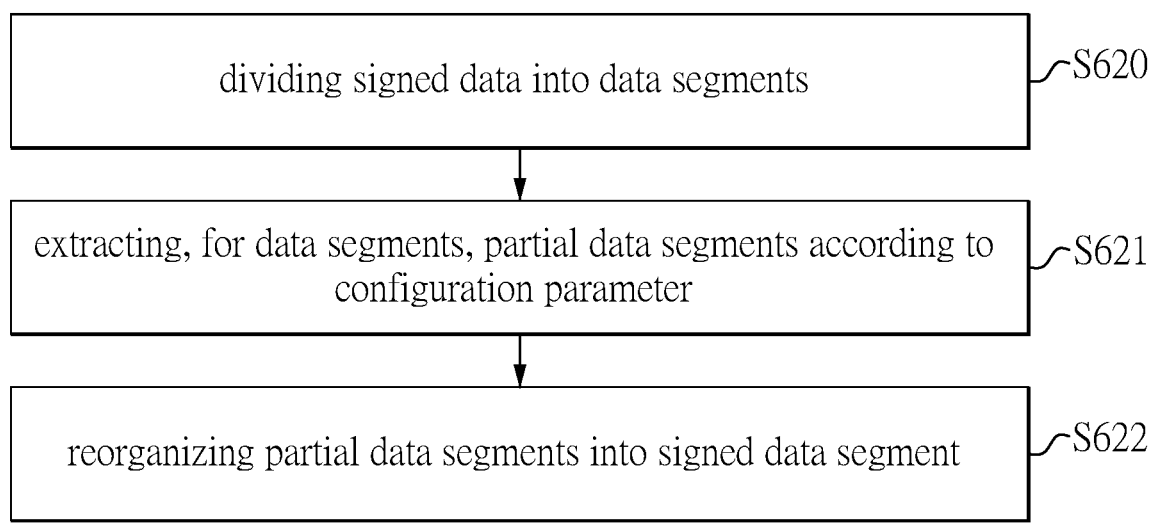
FIG. 7 is a detailed flowchart of step S62 according to the second embodiment of the present disclosure.

Reference is made to FIG. 7, which is a detailed flowchart of step S62 according to the second embodiment of the present disclosure. Step 62 can include:

Step S620: dividing the signed data into a plurality of data segments. Similarly, the signed data is divided according to a configuration parameter, and the configuration parameter defines a file size for the plurality of data segments.

As previously described, the configuration parameter can be a fixed value or a variable value. When the configuration parameter is the fixed value which can be n bytes, n is a positive integer that ranges from 2 to 8. When the configuration parameter is a variable value which can be n bytes, n is a positive integer that varies within a range from 2 to 8.

Step S621: extracting, for the plurality of data segments, the plurality of partial data segments according to the configuration parameter.

Step S622: reorganizing the plurality of partial data segments into the signed data segment.

Details of steps S620 to S622 are the same as those described in steps S110 to S112, and are not repeated hereinafter.

Step S63: performing a hash operation on the signed data segment to obtain a second digest value.

Step S64: decrypting the signature data with the public key to generate a third digest value.

Step S65: determining whether the second digest value is consistent with the third digest value to verify the to-be-verified data.

In response to the second digest value being consistent with the third digest value, the verification method proceeds to step S66: the digital signature is verified. In response to the second digest value not being consistent with the third digest value, the verification method proceeds to step S67: the digital signature fails the verification.

Therefore, in the digital signature method and the verification method for the digital signature provided by the present disclosure, important data segments are extracted and reorganized from input data in a specific way, to reduce computational complexity of the hash operation, so as to improve a verification speed of the digital signature while preventing the original data from being tampered with.

Hereinafter, a manner in which the verification method of the digital signature of the present disclosure is applied to the embedded system 4 is described with reference to FIGS. 4 and 5. Referring to FIG. 5, as mentioned above, the parameter storage partition 410 stores the plurality of configuration parameters n_1, n_2, . . . , n_k, the public key storage partition 412 stores a plurality of public keys key_1, key_2, . . . , key_k, and the main data storage partition 414 stores the to-be-signed data 4140. Further, the to-be-signed data 4140 can include an initialization program BL, an operating system program KL, and a root file system program RF, which can be files such as bootloader, kernel, and rootfs commonly used in embedded systems, respectively. In the present embodiment, the public keys key_1, key_2, . . . , key_k can be, for example, RSA public keys generated by RSA encryption algorithm (corresponding to the private keys in the previous embodiments), but the present disclosure is not limited thereto.

After the digital signature method is applied on these files, the to-be-verified data with the digital signatures are generated, including files such as bootloader, kernel and rootfs. In this embodiment, the public key key_1 can be used to verify a bootloader file, the public key key_2 can be used to verify a kernel file, and the public key key_k can be used to verify a rootfs file.

During a boot process of the embedded system 4, the central processor 40 loads bootloader file in the non-volatile memory 41 into the random-access memory 46, and then obtains the configuration parameter n_1 from the parameter storage partition 410 in the non-volatile memory 41. Next, partial data segments of bootloader file are extracted according to the configuration parameter n_1, the bootloader file is verified according to the public key key_1 of the public key storage partition 412, and the bootloader is executed if the verification is passed. Otherwise, the embedded system 4 is rebooted.

When the central processor 40 executes the bootloader, the bootloader obtains the configuration parameter n_2 and the public key key_2 in a similar process to verify the kernel file, and executes the kernel if the verification is passed. Similarly, when the central processor 40 executes the kernel, the kernel obtains the configuration parameter n_k and the public key key_k in a similar process to verify the rootfs file. If the verification is passed, the rootfs is executed. At this time, the booting sequence of the embedded system 4 is completed, and relevant applications can be further executed.

Beneficial Effects of the Embodiments

In conclusion, in the digital signature method and the verification method for the digital signature provided by the present disclosure, important data segments are extracted and reorganized from input data in a specific way, which can reduce computational complexity of the hash operation, so as to improve speeds of applying and verifying the digital signature whilst preventing the input data from being tampered with.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A digital signature method applicable to an electronic device including a processor and a memory, and the digital signature method comprising:
    configuring the processor to:
        obtain to-be-signed data and a private key used by the electronic device for digital signing;
        extract a to-be-signed data segment from the to-be-signed data, including:
            dividing the to-be-signed data into a plurality of data segments;
            extracting a plurality of partial data segments from the plurality of data segments, respectively; and
            reorganizing the plurality of partial data segments into the to-be-signed data segment;
        perform a hash operation on the to-be-signed data segment formed by reorganizing the plurality of partial data segments to obtain a first digest value;
        encrypt the first digest value with the private key to generate signature data of the to-be-signed data; and
        append the signature data to the to-be-signed data to generate to-be-verified data.

2. The digital signature method according to claim 1, wherein dividing the to-be-signed data into the plurality of data segments and respectively extracting the plurality of partial data segments include:
    dividing the to-be-signed data according to a configuration parameter, wherein the configuration parameter defines a file size for the plurality of data segments; and
    extracting, for the plurality of data segments, the plurality of partial data segments according to the configuration parameter.

3. The digital signature method according to claim 2, wherein the configuration parameter is a fixed value that is n bytes, and n is a positive integer ranging from 2 to 8.

4. The digital signature method according to claim 2, wherein the configuration parameter is a variable value that is n bytes, and n is a positive integer that varies within a range from 2 to 8.

5. The digital signature method according to claim 2, wherein the memory includes a parameter storage partition, a public key storage partition and a main data storage partition, the parameter storage partition stores the configuration parameter, the public key storage partition stores a public key corresponding to the private key, and the main data storage partition stores the to-be-signed data.

6. A verification method for a digital signature, applicable to an electronic device including a processor and a memory, and the verification method for the digital signature comprising:
    configuring the processor to:
        obtain a to-be-verified data and a public key used by the electronic device for verifying the digital signature;
        divide the to-be-verified data into signed data and signature data, wherein the public key corresponds to a private key associated with the signature data;
        extract a signed data segment from the signed data, including:
            dividing the signed data into a plurality of data segments;
            extracting a plurality of partial data segments from the plurality of data segments, respectively; and
            reorganizing the plurality of partial data segments into the signed data segment;
        perform a hash operation on the signed data segment formed by reorganizing the plurality of partial data segments to obtain a second digest value;

decrypt the signature data of the to-be-verified data with the public key to generate a third digest value; and determine whether the second digest value is consistent with the third digest value to verify the to-be-verified data.

7. The verification method according to claim 6, wherein dividing the signed data into the plurality of data segments and respectively extracting the plurality of partial data segments include:

dividing the signed data according to a configuration parameter, wherein the configuration parameter defines a file size for the plurality of data segments; and extracting, for the plurality of data segments, the plurality of partial data segments according to the configuration parameter.

8. The verification method according to claim 7, wherein the configuration parameter is a fixed value that is n bytes, and n is a positive integer ranging from 2 to 8.

9. The verification method according to claim 7, wherein the configuration parameter is a variable value that is n bytes, and n is a positive integer that varies within a range from 2 to 8.

10. The verification method according to claim 7, wherein the memory includes a parameter storage partition, a public key storage partition and a main data storage partition, the parameter storage partition stores the configuration parameter, the public key storage partition stores the public key corresponding to the private key, and the main data storage partition stores the to-be-verified data.

* * * * *